(12) United States Patent
Miki et al.

(10) Patent No.: US 7,232,896 B2
(45) Date of Patent: Jun. 19, 2007

(54) COLORANT FOR OCULAR LENSES AND MATERIAL FOR COLORED OCULAR LENSES USING THE COLORANT

(75) Inventors: Sadao Miki, Kyoto (JP); Masaki Kuwahara, Kyoto (JP); Yoshihiro Nakahata, Aichi (JP); Tsutomu Sunada, Aichi (JP)

(73) Assignee: Nidek Co., Ltd., Aichi (JP)

(*) Notice: Subject to any disclaimer, the term of this patent is extended or adjusted under 35 U.S.C. 154(b) by 56 days.

(21) Appl. No.: 11/270,527

(22) Filed: Nov. 10, 2005

(65) Prior Publication Data

US 2006/0096044 A1    May 11, 2006

(30) Foreign Application Priority Data

Nov. 10, 2004  (JP)  ............. P.2004-326341

(51) Int. Cl.
*C09B 62/465* (2006.01)
*C09B 62/475* (2006.01)
*A61F 2/16* (2006.01)

(52) U.S. Cl. ............... 534/829; 548/365.4; 8/507; 623/6.56; 623/6.58

(58) Field of Classification Search ............... 534/829; 548/365.4; 8/507; 623/6.56, 6.58
See application file for complete search history.

(56) References Cited

U.S. PATENT DOCUMENTS

| 2,274,782 A | 3/1942 | Gaspar |
| 2,369,355 A | 2/1945 | Kendall et al. |
| 3,984,199 A | 10/1976 | Heinrich et al. |
| 5,662,707 A | 9/1997 | Jinkerson |
| 6,310,215 B1 * | 10/2001 | Iwamoto ............... 548/365.4 |

FOREIGN PATENT DOCUMENTS

| EP | 0 131 468 A2 | 1/1985 |
| EP | 0 899 590 A2 | 3/1999 |
| EP | 1 043 365 A1 | 10/2000 |
| EP | 1 431 350 A1 | 6/2004 |
| JP | 1-280464 A | 11/1989 |
| JP | 7-24052 A | 1/1995 |
| WO | WO 97/01114 A1 | 1/1997 |

OTHER PUBLICATIONS

European Search Report dated Mar. 15, 2006.

* cited by examiner

*Primary Examiner*—Fiona T. Powers
(74) *Attorney, Agent, or Firm*—Sughrue Mion, PLLC

(57) ABSTRACT

A colorant for ocular lenses represented by the formula (I) defined herein or a colorant for ocular lenses represented by the formula (II) defined herein.

9 Claims, 1 Drawing Sheet

COLORANT FOR OCULAR LENSES AND MATERIAL FOR COLORED OCULAR LENSES USING THE COLORANT

FIELD OF THE INVENTION

The present invention relates to a colorant for ocular lenses such as contact lenses and intraocular lenses and a material for colored ocular lenses with the use of this colorant.

BACKGROUND OF THE INVENTION

There have been known colored intraocular lenses in which transmission of rays in the blue region of about 400 nm to 500 nm is regulated for relieving retinal light damage or as a countermeasure against cyanopsia. In these colored intraocular lenses, materials for intraocular lenses are colored in yellow, orange, etc. by kneading a yellow colorant, a red colorant, an orange colorant, etc. into hard intraocular lens materials such as PMMA. There is also proposed an invention providing a soft intraocular lens for treating cyanopsia which is obtained by adding a small amount of a colorant to a flexible and soft intraocular lens material to give a colored soft intraocular lens (see, JP-A-7-24052).

Because of having dense molecular structures, hard intraocular lens materials such as PMMA scarcely suffer from the elution (bleeding) of the colorants having been kneaded thereinto. In the case of adding a colorant to a soft intraocular lens material to be used in soft intraocular lenses, however, there arises a problem that the colorant would be eluted from the soft intraocular lens material due to the coarse molecular structure thereof.

SUMMARY OF THE INVENTION

A technical problem to be solved by the invention, which has been made to solve those problems occurring in the conventional techniques, is to provide a colorant for ocular lenses which can be used without the problem of the elution and a material for colored ocular lenses with the use of this colorant.

The present inventors have found out that compounds represented by the formulae I and II:

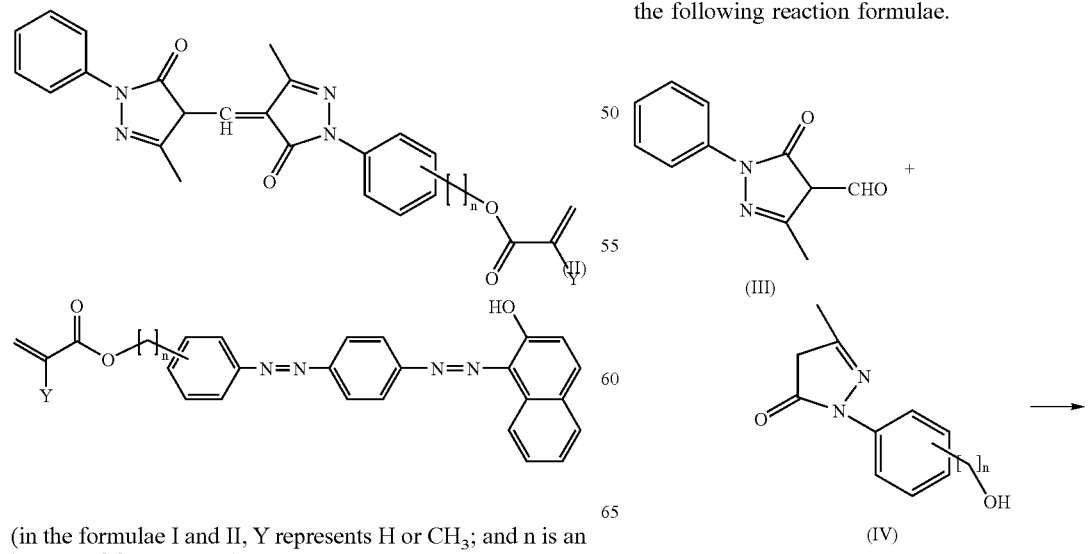

(in the formulae I and II, Y represents H or $CH_3$; and n is an integer of from 1 to 5;)

are suitably usable as colorants for ocular lenses such as contact lenses and intraocular lenses. Among the compounds represented by the formula I, a compound wherein Y is $CH_3$ and n is 1 can be particularly suitably usable as a colorant for ocular lenses. Among the compounds represented by the formula II, a compound wherein Y is $CH_3$ and n is 2 can be particularly suitably usable as a colorant for ocular lenses.

Moreover, a material for colored ocular lenses, which contains 0.003% by weight or more but not more than 0.03% by weight of a colorant for ocular lenses represented by the formula I and 0.0003% by weight or more but not more than 0.003% by weight of a colorant for ocular lenses represented by the formula II, each based on the total amount, controls the light transmission in the blue region of about 400 nm to 500 nm to thereby exhibit light transmission properties closely similar to human lens.

The colorants according to the present invention can be favorably employed in ocular lenses such as soft contact lenses and intraocular lenses without elution from the ocular lenses after wearing.

DETAILED DESCRIPTION OF THE INVENTION

Figure 1:
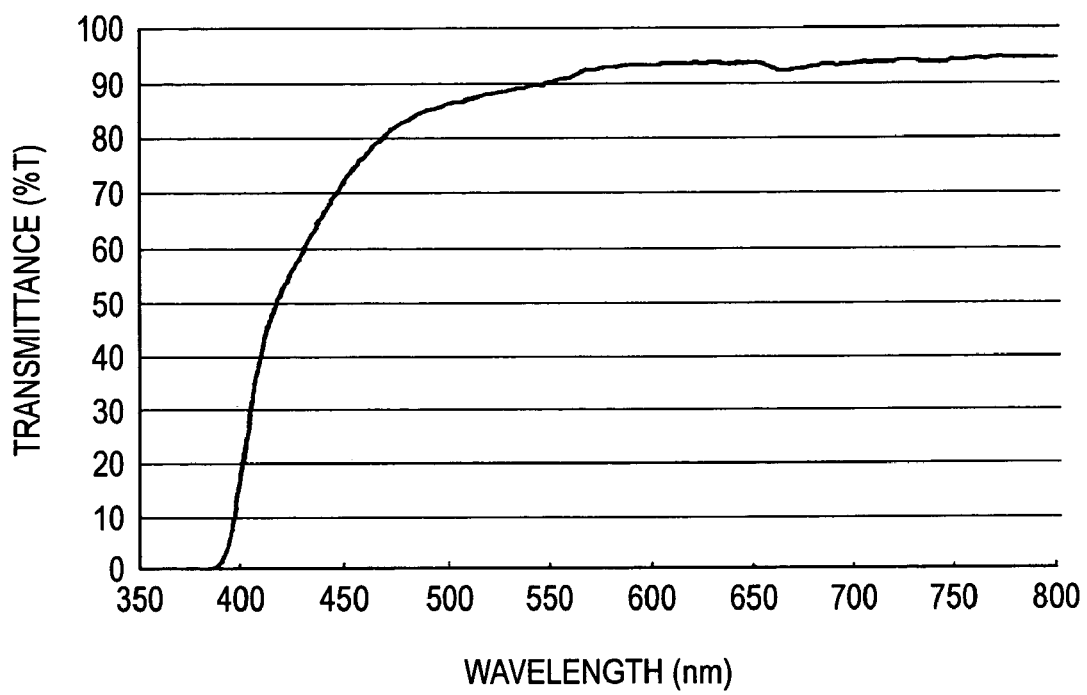
FIG. 1 is a graph that shows the transmittance of the base material for intraocular lenses obtained by using the colorants according to the present embodiments.

Now, a mode for carrying out the present invention will be illustrated.

<Production of Colorant for Ocular Lenses>

First, a mode for embodying the process for synthesizing a compound represented by the formula I to be used as the colorant for ocular lenses according to the present invention will be described. The compound represented by the formula I enables the coloration of colored ocular lenses in yellow. Further, it has a favorable copolymerizability with a material (monomer) for ocular lenses and, therefore, is scarcely eluted from ocular lenses. The compound represented by the formula I can be produced in accordance with, for example, the following reaction formulae.

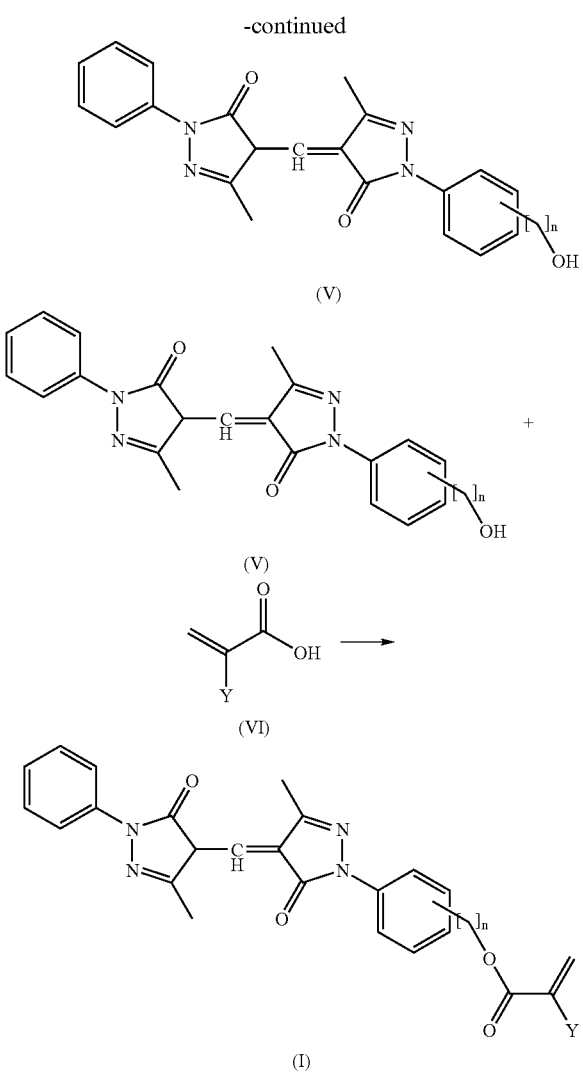

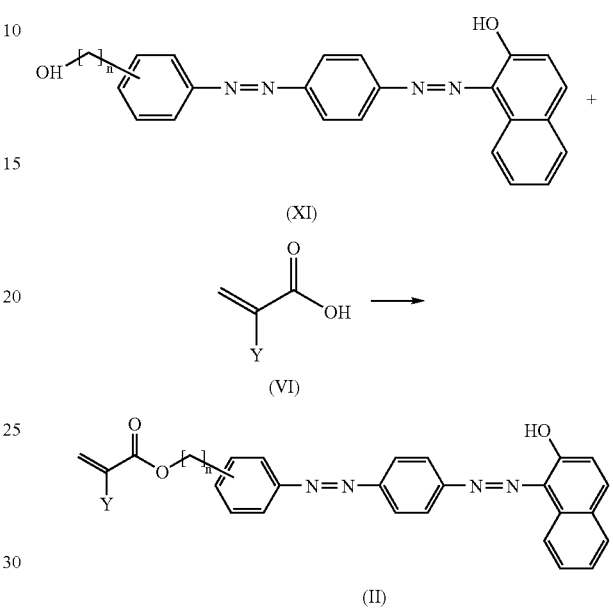

More specifically speaking, compounds represented by the above formulae III and IV (wherein n is an integer of from 1 to 5) are fed under acidic conditions and refluxed under stirring at a predetermined temperature for a predetermined period of time. Next, a predetermined amount of a solvent such as an alcohol (for example, methanol) or diethyl ether is added and the resultant mixture is reacted while continuously stirring at the predetermined temperature to give a compound represented by the formula V.

Next, the compound represented by the formula V is added to dry dichloromethane. A compound represented by the above formula VI (wherein Y is H or CH$_3$) and 4-dimethylaminopyridine are added thereto and the resultant mixture is stirred for a predetermined period of time. To the obtained solution, N-ethyl-N'-(3-dimethylaminopropyl) carbodiimide hydrochloride is added over a predetermined period of time and the resultant mixture is reacted by stirring for a predetermined period of time. Thus, the desired compound represented by the formula I, which is usable as a colorant for ocular lenses, can be obtained.

Next, a mode for embodying the process for synthesizing a compound represented by the formula II to be used as the colorant for ocular lenses according to the present invention will be described. The compound represented by the formula II enables the coloration of colored ocular lenses in red. Further, it has a favorable copolymerizability with a material (monomer) for ocular lenses and, therefore, is scarcely eluted from ocular lenses. The compound represented by the formula II can be produced in accordance with, for example, the following reaction formulae.

More specifically speaking, a compound represented by the formula XI (wherein n is an integer of from 1 to 5) is fed into dry dichloromethane. A compound represented by the above formula VI (wherein Y is H or CH$_3$) and 4-dimethylaminopyridine are added thereto and the resultant mixture is stirred for a predetermined period of time. To the obtained solution, N-ethyl-N'-(3-dimethylaminopropyl) carbodiimide hydrochloride is added over a predetermined period of time and the resultant mixture is reacted by stirring for a predetermined period of time. Thus, the desired compound represented by the formula II, which is usable as a colorant for ocular lenses, can be obtained.

The compound represented by the formula XI can be obtained in accordance with the following reaction formulae.

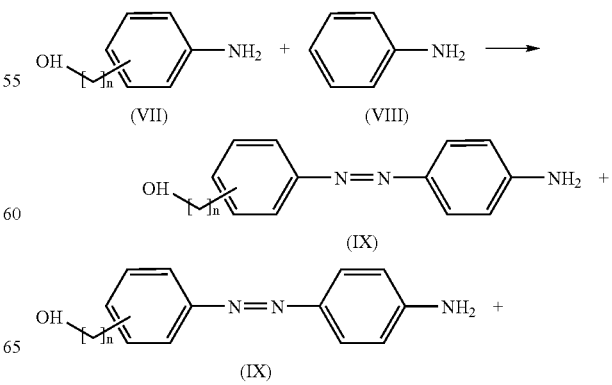

-continued

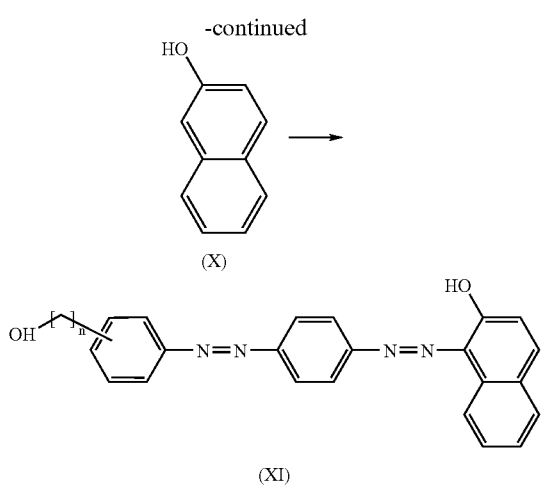

More specifically speaking, sodium bisulfite is dissolved in water and an aqueous formalin solution is added thereto. After stirring, a compound represented by the formula VII (wherein n is an integer of from 1 to 5) is added thereto and the resultant mixture is reacted by stirring for a predetermined period of time to thereby give a solution A. Separately, conc. hydrochloric acid is dissolved in water and the compound represented by the formula VIII (aniline) is added thereto followed by cooling. To this solution, an aqueous solution containing sodium nitrite dissolved therein is added dropwise over a predetermined period of time and the resultant mixture is reacted by stirring at a low temperature to thereby give a solution B. The obtained solution B is added at once to the above-described solution A and the resultant mixture is reacted at a predetermined temperature for a predetermined period of time. Further, an aqueous sodium hydroxide solution is added to the above solution and the resultant mixture is reacted. Then, reaction product is precipitated and the thus obtained precipitate is purified to thereby give a compound represented by the formula IX.

The compound represented by the formula IX thus obtained is added to hydrochloric acid and ice-cooled. To the obtained solution, an aqueous sodium nitrite solution is added dropwise and the resultant mixture is stirred for a predetermined period of time. The obtained solution is added at once to an aqueous sodium hydroxide solution containing the compound represented by the formula X (β-naphthol) dissolved therein followed by reacting to thereby give the compound represented by the formula XI.

<Production of Colored Intraocular Lens>

Next, a method of producing a colored intraocular lens by using the colorants for ocular lenses represented by the formulae I and II as described above will be illustrated.

As the intraocular lens material to be employed in this embodiment, use can be made of those conventionally employed. It is particularly suitable to use an intraocular lens material which is soft and flexible at room temperature. Examples of such a soft intraocular lens material include linear, branched and cyclic alkyl (meth)acrylate such as methyl (meth)acrylate, ethyl (meth)acrylate, propyl (meth) acrylate, n-butyl (meth)acrylate, tert-butyl (meth)acrylate, isobutyl (meth)acrylate, n-pentyl (meth)acrylate, tert-pentyl (meth) acrylate, hexyl (meth)acrylate, 2-methylbutyl (meth) acrylate, heptyl (meth)acrylate, octyl (meth)acrylate, 2-ethylhexyl (meth)acrylate, nonyl (meth) acrylate, decyl (meth) acrylate, dodecyl (meth) acrylate, stearyl (meth) acrylate, cyclopentyl (meth) acrylate, cyclohexyl (meth) acrylate and ethylene glycol phenyl ether acrylate. A copolymer obtained by using one or more of them can be used as a soft acrylic base material. The term " - - - (meth)acrylate" as used herein means either " - - - acrylate" or " - - - methacrylate".

In the case where it is intended to obtain a soft intraocular lens material having hydrophilic surface, use can be made of, for example, the following substances.

N-Vinyllactams such as N-vinylpyrrolidone, α-methylene-N-methylyprrolidone and N-vinylcaprolactam; hydroxyl group-containing (meth)acrylates such as hydroxyethyl (meth) acrylate, hydroxypropyl (meth) acrylate, hydroxybutyl (meth)acrylate, dihydroxypropyl (meth) acrylate, dihydroxydibutyl (meth)acrylate, diethylene glycol mono (meth)acrylate, triethylene glycol mono(meth)acrylate and dipropylene glycol mono(meth)acrylate; (meth) acrylic acid; (meth)acrylamide, N-methyl(meth)acrylamide, N-ethyl(meth)acrylamide, N-hydroxyethyl(meth)acrylamide, N,N-dimethyl(meth)acrylamide, N,N-diethyl(meth) acrylamide, N-ethylaminoethyl(meth)acrylamide and the like.

It is also possible to use copolymers thereof, for example, combinations such as a copolymer of ethyl methacrylate with methyl methacrylate, a copolymer of 2-ethylhexyl methacrylate with butyl methacrylate and a copolymer of 2-ethylhexyl methacrylate with dodecyl methacrylate.

To produce a colored soft base material (or its material) with the use of the above material for ocular lenses, the above-described (meth)acrylate employed as the main material may be combined with various vinyl-base copolymerizable monomers so as to achieve the desired hardness, repellency and opening speed of the intraocular lens. After adding a crosslinking agent, a polymerization initiator, an ultraviolet light absorber and the colorant obtained in the above-described synthesis, the mixture is put into a mold form or a container and then polymerization is performed. Since the colorant is copolymerized with the intraocular lens materials such as (meth)acrylate, it is scarcely eluted from the soft base material.

Although either the yellow-type colorant represented by the formula I or the red-type colorant represented by the formula II as described above may be employed alone, it is preferred to use a combination of these colorants so as to give a color more closely similar to the human lens having turned into a yellowish color due to aging. In the case of using a combination of these colorants, it is preferable that the content of the yellow colorant represented by the formula I is 0.001% by weight or more but not more than 0.1% by weight, still preferably 0.003% by weight or more but not more than 0.03% by weight, based on the total amount of the soft base material for intraocular lenses thus obtained (colored base material). On the other hand, it is preferable that the content of the red colorant represented by the formula II is 0.0001% by weight or more but not more than 0.01% by weight, still preferably 0.0003% by weight or more but not more than 0.03% by weight, based on the total amount of the soft base material for intraocular lenses thus obtained (colored base material). In the case where these colorants are employed at lower ratios, the obtained colored soft base material has only a faint color and, therefore, it is meaningless to add these colorants. In the case where these colorants are employed at higher ratios, the obtained soft base material cannot be used in practice because of being too deep in hue.

Since the soft base material should be soft and flexible at room temperature, the composition ratio of various (meth) acrylic copolymerizable monomers is determined in such a manner as to give a soft base material preferably having a glass transition temperature of 10° C. or lower, still preferably 5° C. or lower.

As the crosslinking agent to be used in the polymerization, use can be made of crosslinking agents typified by ethylene glycol di(meth)acrylate, 1,4-butanediol di(meth)acrylate, 1,6-hexanediol di(meth)acrylate, etc. As the polymerization initiator, it is preferable to use 2,2-azobisisobutyronitrile, azobisdimethylvaleronitrile, benzoin, methylorthobenzoyl benzoate, etc.

As preferable examples of the UV absorber, benzotriazole UV absorbers of the coupling type typified by 2-(2'-hydroxy-5'-methacryloxyethylphenyl)-2H-benzotriazole, benzophenone UV absorbers of the coupling type typified by 2-hydroxy-5-glycidyl benzophenone, etc. may be cited.

The polymerization is carried out via the heat polymerization, the UV polymerization or the like, though it varies depending on the polymerization initiator added. The colored soft base material thus obtained is hardened by, for example, freezing, to such an extent as allowing cutting. Then it is cut into a desired shape. Thus, a colored soft intraocular lens can be obtained. Alternatively, a colored soft intraocular lens can be obtained by introducing the main material, the crosslinking agent, the polymerization initiator, the UV absorber and the colorant into a mold form and then polymerizing and hardening the mixture.

Although a soft base material which is flexible at room temperature is employed as a material to be colored in this embodiment, the invention is not restricted thereto. Namely, the colorant according to the invention is also usable in an intraocular lens made of a hard base material which is non-flexible at room temperature. The colorant according to the invention is usable not only in intraocular lenses but also in other ocular lenses such as contact lenses. The material for ocular lenses according to the present invention is usable in both of one-piece type products wherein an optical member and a supporting member are integrally molded together or three-piece type products wherein an optical member and a supporting member are constructed separately and then integrated together.

EXAMPLES

Example 1

Production of Yellow Colorant for Ocular Lenses 4-(5'-hydroxy-3'-methyl-1'-phenyl-4'-pyrazolylmethylene)-1-(4'-methacryloyloxymethylphenyl)-3-methyl-2-pyrazolin-5-one Under an argon gas stream, 3-methyl-1-phenyl-2-pyrazolin-5-one (150 g, 861 mmol) was fed into dry DMF (dimethylformamide) (210 mL) and ice-cooled. After adding phosphorus oxychloride (57.0 mL, 629 mmol) dropwise thereinto at 2° C. to 9° C. over 30 minutes, the resultant mixture was reacted at 40 to 50° C. for 2.5 hours. After cooling to room temperature, it was added dropwise into ice-water (3.1 kg) over 1 hour. Next, it was immersed in a water bath at 24° C. and stirred for 16 hours. The crystals thus precipitated were collected by filtration to thereby give the compound represented by the above formula III (139.5 g, 692 mmol) as yellow crystals.

Under an argon gas stream, 4-(3-methyl-5-oxo-2-pyrazolin-1-yl)benzoic acid (204.5 g, 937 mmol) was fed into dry chloroform (10.2 L). After adding triethylamine (1.02 L, 7.34 mol), the resultant mixture was ice-cooled. Then ethyl chlorocarbonate (511 mL, 3.13 mol) was added dropwise thereto at 1 to 7° C. over 20 minutes and the resultant mixture was reacted at 16 to 21° C. for 2 hours, After extracting with THF, an aqueous solution (2.45 L) of sodium borohydride (85.1 g, 2.25 mmol) was added thereto at room temperature over 6 minutes. After reacting at 28 to 35° C. for 2 hours, the mixture was concentrated under reduced pressure. To the aqueous solution thus obtained, 5% hydrochloric acid (900 mL) was added to thereby adjust the pH value to 4. Next, it was extracted with chloroform (4 L×3). The extract was purified by column chromatography with the use of chloroform/methanol as a developing solvent. Thus, a compound represented by the formula XII (99.6 g, 488 mmol) was obtained.

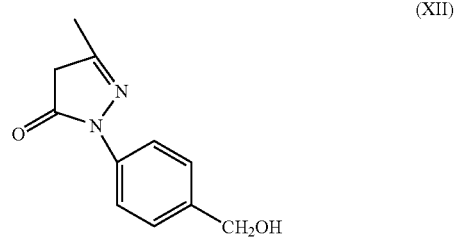

(XII)

The compound represented by the formula III (98.7 g, 488 mmol) and the compound represented by the formula XII were fed into acetic acid (540 mL) and the mixture was heated to 104° C. over 30 minutes. After refluxing at 104 to 113° C. for 15 minutes, it was cooled to room temperature and methanol (1.43 L) was added thereto. After stirring at 1 to 3° C. for 2 hours, the crystals thus precipitated were collected by filtration and purified by column chromatography with the use of chloroform/methanol as a developing solvent. Thus, a compound represented by the formula XIII (78.6 g, 277 mmol) was obtained as yellow crystals.

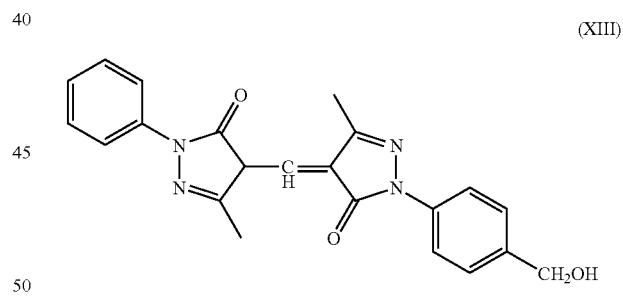

(XIII)

A compound represented by the above formula V wherein n is 1.

The compound represented by the formula XII (78.6 g, 277 mmol) thus obtained was fed into dry dichloromethane (11.8 L) and methacrylic acid (23.9 g, 277 mmol) and 4-dimethylaminopyridine (44.5 g, 364mmol) were added thereto. After adding N-ethyl-N'-(3-dimethylaminopropyl) carbodiimide hydrochloride (75.4 g, 394 mmol) at 17° C. over 20 minutes, the mixture was reacted for additional 19 hours and then purified by column chromatography with the use of dichloromethane as a developing solvent. By drying the compound obtained by the purification at room temperature under reduced pressure, the target colorant for ocular lenses represented by the formula XIV (60.9 g, 133 mmol) was obtained as yellow crystals.

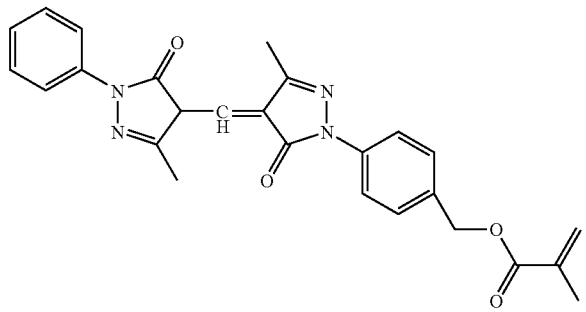

(XIV)

A compound represented by the above formula I wherein Y is CH$_3$ and n is 1.

Production of Red Colorant for Ocular Lenses
1-[4'-(4''-methacryloyloxyethylphenylazo)phenylazo]-2-naphthol At room temperature, sodium bisulfite (97.8 g, 940 mmol) was dissolved in water (4.73 L) and a 37% aqueous formalin solution (76.3 g, 940 mmol) was, added thereto followed by stirring for 10 minutes. Next, 4-aminophenethyl alcohol (87.5 g, 940 mmol) was added thereto. After confirming the formation of a homogeneous solution, the solution was stirred at room temperature for additional 1.5 hours to give a solution A.

Conc. sulfuric acid (175 mL) was dissolved in water (3.5 L). After adding aniline (129 g, 940 mmol), ice (875 g) was added thereto and the mixture was cooled to 1° C. Sodium nitrite (69.7 g, 1.01 mol) was dissolved in water (350 mL) and the obtained solution was added dropwise into the above mixture at −1 to 1° C. over 20 minutes. After reacting at −1 to 1° C. for 30 minutes, a solution B was obtained.

The solution B was added at once to the solution A and reacted at 20° C. for 30 minutes. Further, sodium hydroxide (347 g, 8.68 mol)/water (2.28 L) were added thereto. The resultant mixture was heated to 95° C. over 3 hours and then reacted at 94 to 101° C. for 2 hours. After cooling to room temperature, the tar-like product thus precipitated was filtered, washed with water and extracted with methanol. By concentrating under reduced pressure, a dark brown tar-like product (105 g) was obtained. Then it was purified by column chromatography with the use of toluene/ethyl acetate=7/3 as a developing solvent to thereby give a compound represented by the formula XV (39.8 g, 165 mmol) as yellowish brown crystals.

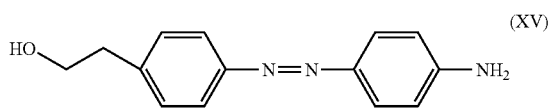

(XV)

The compound represented by the formula XV (75.6 g, 313 mmol) was fed into conc. hydrochloric acid (90.9 mL)/water (1.66 L) and ice-cooled by adding ice (600 g). Next, sodium nitrite (27.2 g, 394 mmol)/water (150 mL) were added dropwise thereto at −1 to 0° C. over 5 minutes and the resultant mixture was stirred at 0 to 1° C. for 30 minutes. This solution was added at once to a solution prepared by dissolving β-naphthol (45.1 g, 313 mmol) in sodium hydroxide (38.0 g, 950 mmol)/water (3.8 L). After reacting for 3 hours, the crystals thus precipitated were collected by filtration and washed with water. By purifying by column chromatography with the use of THF as a developing solvent, a compound represented by the formula XVI (107.7 g, 271 mmol) was obtained as red crystals.

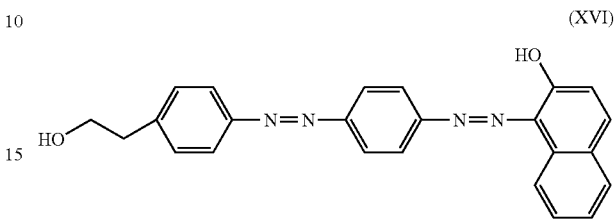

(XVI)

A compound represented by the above formula XI wherein n is 2.

The compound represented by the formula XVI (107.7 g, 271 mmol) was fed into dry dichloromethane (9.96 L) and methacrylic acid (21.6 g, 251 mmol) and 4-dimethylaminopyridine (36.8 g, 301 mmol) were added thereto. Next, N-ethyl-N'-(30dimethylaminopropyl)carbodiimide hydrochloride (62.5 g, 326 mmol) was added thereto over 10 minutes. After reacting for 18 hours, the reaction mixture was purified by column chromatography with the use of toluene/ethyl acetate=50:1 as a developing solvent. Thus, the target colorant for ocular lenses represented by the formula XVII (27.9 g, 61.1 mmol) was obtained as red crystals.

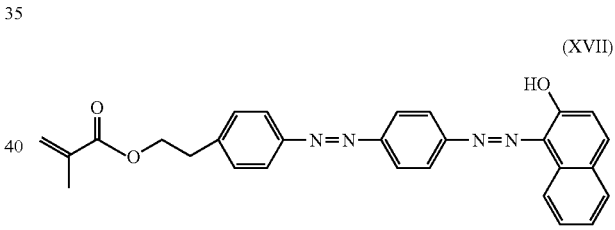

(XVII)

A compound represented by the above formula II wherein Y is CH$_3$ and n is 2.

0.006% by weight of the yellow colorant obtained above, 0.0008% by weight of the red colorant, 53.9% by weight of ethylene glycol phenyl ether acrylate, 39.7% by weight of n-butyl methacrylate, 4.0% by weight of n-butyl acrylate, 2.0% by weight of 1,4-butanediol dimethacrylate employed as a crosslinking agent, 0.3% by weight of 2-(2'-hydroxy-5'-methacryloxypropyl-3'-tert-butylphenyl)-5-chloro-2H-benzotriazole employed as an UV light absorber, and a trace amount of 2,2-azobisisobutyronitrile employed as a polymerization initiator were mixed together and supplied into a test tube. Then the mixture was polymerized in a thermostat at 60° C. for 24 hours, in an air oven at 95° C. for 24 hours and then in a vacuum oven at 95° C. to thereby give a soft base material for intraocular lenses (a base material for ocular lenses) in an orange color.

The base material for intraocular lenses thus obtained was shaped into a plate of 6 mm in diameter and 1 mm in thickness and the transmittance was measured (a spectrophotometer U-4000 manufactured by HITACHI, Ltd.). Table 1 shows the results. As Table 1 shows, the obtained plate absorbed almost all rays within the ultraviolet region of 350 nm to 400 nm in wavelength and also absorbed rays of 400 nm to 500 nm in wavelength, i.e., showing light absorption properties closely similar to the human lens.

The obtained plate was soaked in acetone and stored as such in an air oven at 60° C. for 72 hours. After thus storing for 72 hours under heating, the plate was taken out and the appearance was examined. As a result, no decoloration was observed. Further, the transmittance was measured. As a result, little change in the transmittance was observed.

Comparative Example 1

A soft base material for intraocular lenses in an orange color was obtained under the same conditions as in EXAMPLE 1 but using a yellow colorant Yellow AG (manufactured by NIPPON KAYAKU Co., Ltd.) and a red colorant Sudan I (manufactured by KISHIDA CHEMICAL Co., Ltd.). The base material for intraocular lenses thus obtained was shaped into a plate of 6 mm in diameter and 1 mm in thickness and treated with acetone as in EXAMPLE 1. After the treatment with acetone, the plate was completely decolorized.

Comparative Example 2

A soft base material for intraocular lenses in a blue color was obtained under the same conditions as in EXAMPLE 1 but using a colorant Kayalon Polyster Navy Blue ES-SF300 R-822 (manufactured by NIPPON KAYAKU Co., Ltd.). The base material for intraocular lenses thus obtained was shaped into a plate of 6 mm in diameter and 1 mm in thickness and treated with acetone as in EXAMPLE 1. After the treatment with acetone, the plate was completely decolorized.

This application is based on Japanese Patent application JP 2004-326341, filed Nov. 10, 2004, the entire content of which is hereby incorporated by reference, the same as if set forth at length.

What is claimed is:

1. A colorant for ocular lenses represented by the following formula (I):

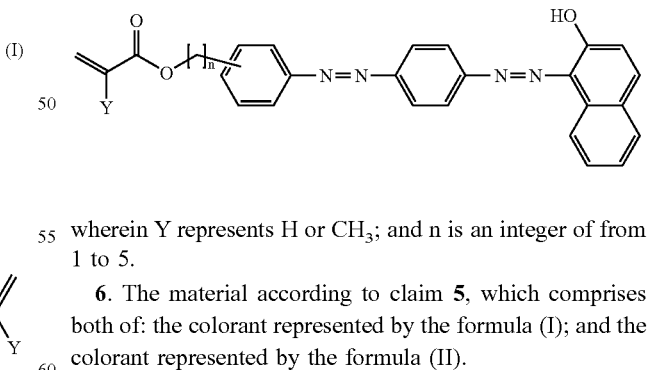

wherein Y represents H or $CH_3$; and n is an integer of from 1 to 5.

2. The colorant according to claim 1, wherein Y represents $CH_3$ and n is 1.

3. A colorant for ocular lenses represented by the following formula (II):

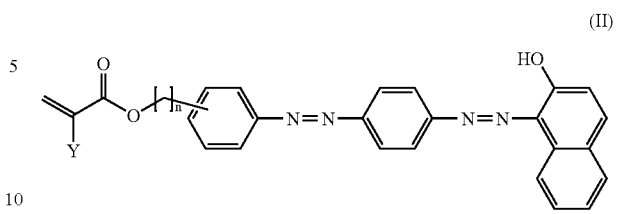

wherein Y represents H or $CH_3$; and n is an integer of from 1 to 5.

4. The colorant according to claim 3, wherein Y represents $CH_3$ and n is 2.

5. A material for colored ocular lenses comprising at least one of:

a colorant represented by the following formula (I):

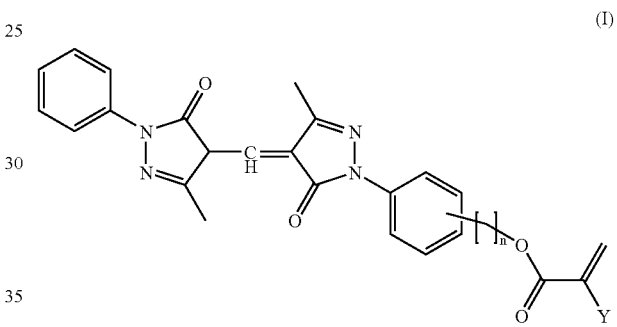

wherein Y represents H or $CH_3$; and n is an integer of from 1 to 5; and a colorant represented by the following formula (II):

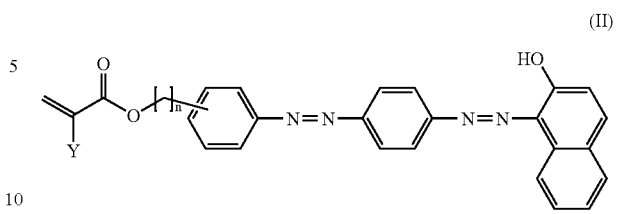

wherein Y represents H or $CH_3$; and n is an integer of from 1 to 5.

6. The material according to claim 5, which comprises both of: the colorant represented by the formula (I); and the colorant represented by the formula (II).

7. The material according to claim 6, further comprising a base material in which an amount of the colorant represented by the formula (I) is from 0.001 to 0.1% by weight based on a colored base material, and an amount of the colorant represented by the formula (II) is from 0.0001 to 0.01% by weight based on a colored base material.

8. The material according to claim 7, wherein an amount of the colorant represented by the formula (I) is from 0.003 to 0.03% by weight based on the colored base material, and an amount of the colorant represented by the formula (II) is from 0.0003 to 0.003% by weight based on the colored base material.

9. The material according to claim 7, wherein the base material has a glass transition temperature of 10° C. or lower.

* * * * *